United States Patent
Kershaw et al.

[11] Patent Number: 5,989,151
[45] Date of Patent: Nov. 23, 1999

[54] HYBRID ENGINE COOLING SYSTEM HAVING ELECTRIC MOTOR WITH ELECTRO-MAGNETIC CLUTCH

[75] Inventors: Peter A. Kershaw; Marek Horski; Andrew Lakerdas, all of London; Oliver Stegelmann, Strathroy, all of Canada

[73] Assignee: Siemens Canada Limited, Mississauga, Canada

[21] Appl. No.: 09/132,320

[22] Filed: Aug. 11, 1998

[51] Int. Cl.[6] .............................. F01P 7/02; F16D 27/112
[52] U.S. Cl. ...................... 477/13; 123/41.12; 192/82 T; 192/84.96
[58] Field of Search ............................. 192/82 T, 84.96, 192/84.961; 123/41.12; 477/13

[56] References Cited

U.S. PATENT DOCUMENTS

| | | |
|---|---|---|
| 1,373,848 | 4/1921 | Waite . |
| 1,481,307 | 1/1924 | Stuart . |
| 2,505,597 | 4/1950 | Weiser . |
| 2,538,299 | 1/1951 | Dewandre . |
| 2,912,963 | 11/1959 | Dufresne . |
| 3,394,682 | 7/1968 | Bensinger . |
| 3,853,098 | 12/1974 | Ishikawa et al. ..................... 123/41.11 |
| 3,894,521 | 7/1975 | Sakasegawa et al. ............... 123/41.12 |
| 3,924,585 | 12/1975 | Woods ............................... 192/84.961 |
| 4,040,272 | 8/1977 | Boyd .......................................... 64/26 |
| 4,074,662 | 2/1978 | Estes ........................... 192/84.961 X |
| 4,119,184 | 10/1978 | Mower et al. ......................... 192/82 T |
| 4,275,688 | 6/1981 | Abe et al. .............................. 123/41.12 |
| 4,373,482 | 2/1983 | Goscenski, Jr. ...................... 123/198 R |
| 4,441,462 | 4/1984 | Budinski .............................. 123/41.11 |
| 4,846,327 | 7/1989 | Mayer ................................. 192/84.961 |
| 4,896,757 | 1/1990 | Seager, Sr. ................................. 192/84 |
| 5,180,003 | 1/1993 | Kouzel et al. ........................... 165/121 |
| 5,415,134 | 5/1995 | Stewart, Jr. ........................... 123/41.01 |
| 5,617,817 | 4/1997 | Martin ................................... 123/41.12 |

Primary Examiner—Rodney H. Bonck

[57] ABSTRACT

A vehicle engine cooling system includes a coupling assembly to be connected to and rotated by a vehicle engine output shaft. An electric motor includes a motor shaft having first and second ends. An impeller is coupled to the first end of the motor shaft. A clutch structure is integral with the electric motor and includes an input member carried by the second end of the motor shaft for rotation therewith. An end of the coupling structure is operatively associated with the input member to cause rotation of the input member upon rotation of the coupling assembly. An electro-magnet structure is disposed about the input member. The clutch structure also includes output structure having a mounting member fixed to the motor shaft. A movable element, including magnetically permeable material, is mounted with respect to the mounting member for rotational movement therewith and for movement between a non-engaging position and an engaging position. A spring biases the movable element towards the non-engaging position. A switching structure is operatively associated with the electric motor and with the electro-magnet structure and is movable between a first position providing electric current to the electric motor and a second position providing electric current to the electromagnet structure. When the switching structure is in the second position, the movable element moves to the engaging position. When the switching structure is moved to the first position, the electro-magnet structure is deenergized and the spring returns the movable element to the non-engaging position with.

19 Claims, 2 Drawing Sheets

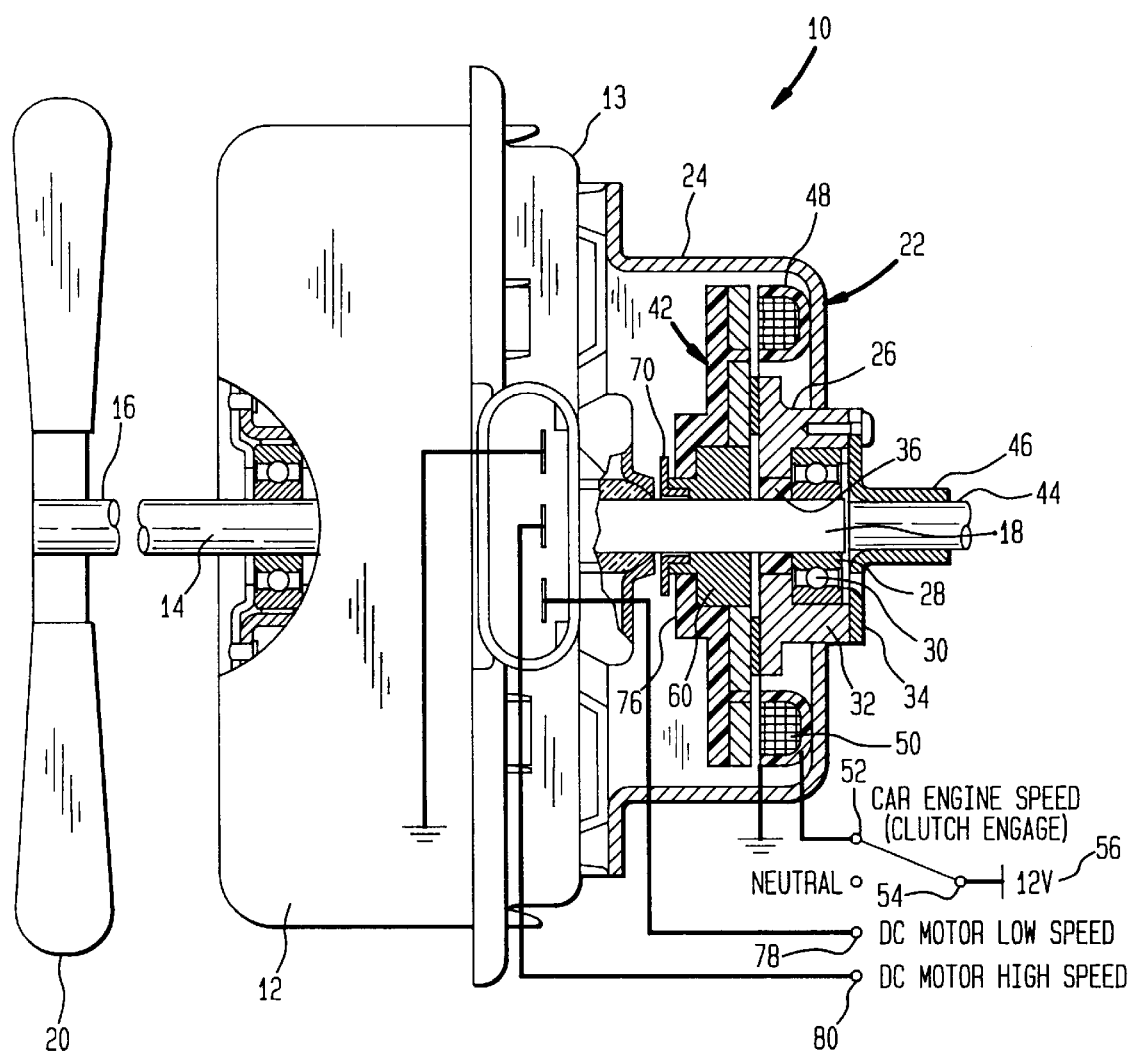

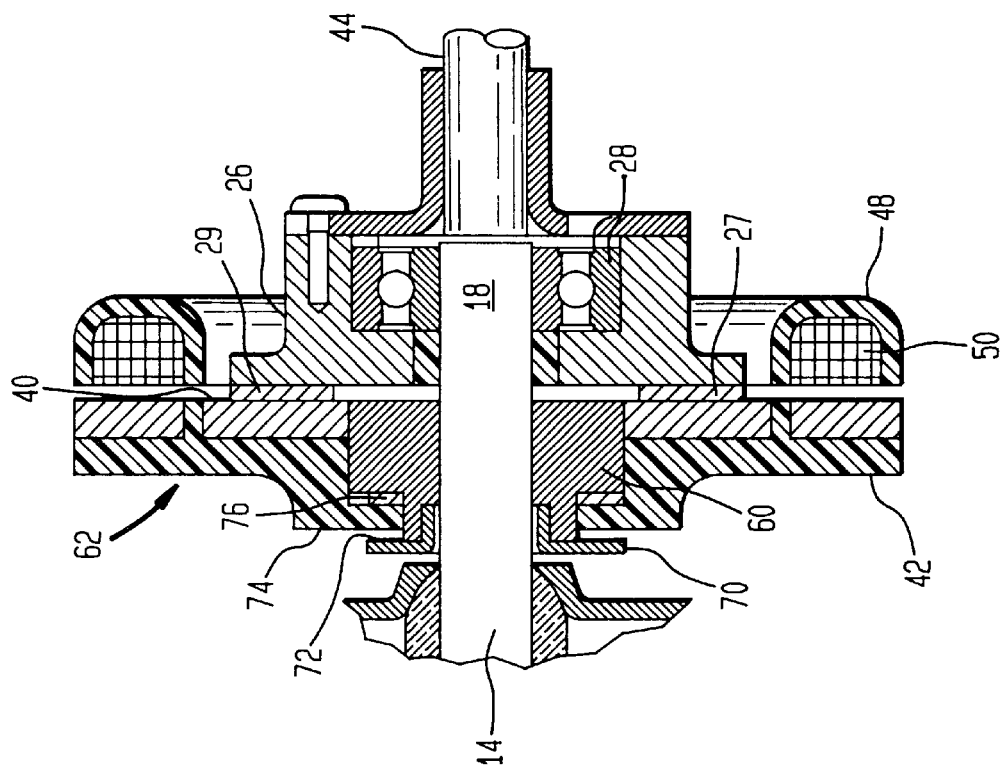
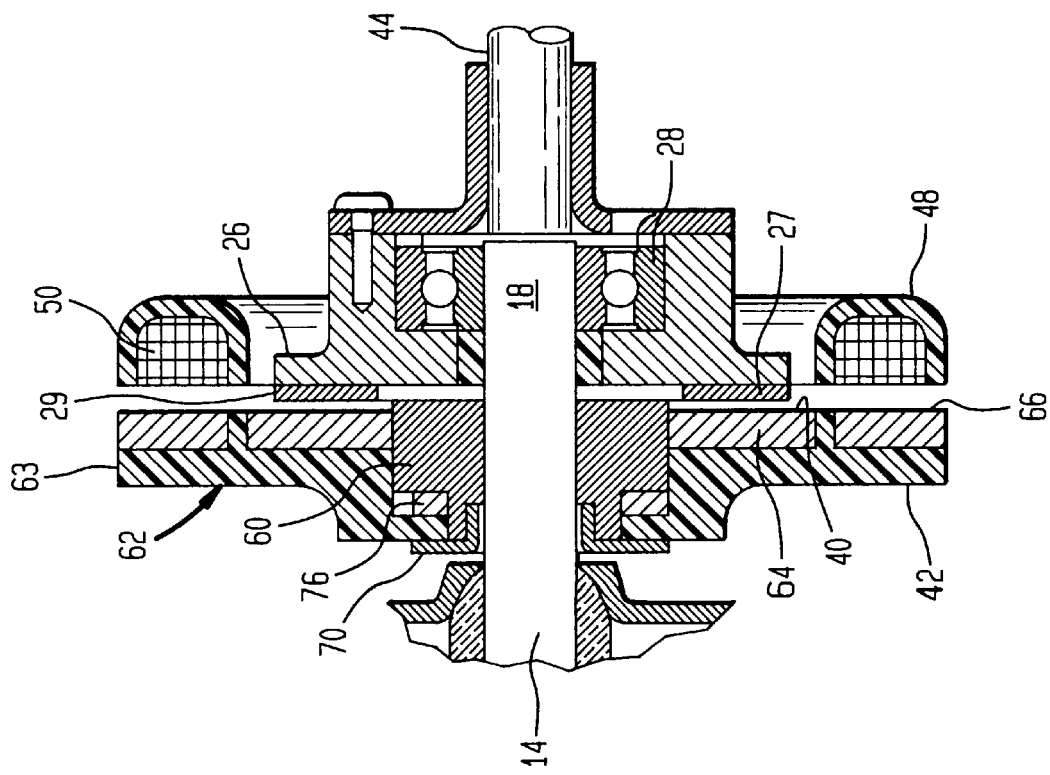

5,989,151

HYBRID ENGINE COOLING SYSTEM HAVING ELECTRIC MOTOR WITH ELECTRO-MAGNETIC CLUTCH

BACKGROUND OF THE INVENTION

Internal combustion engines for use in vehicles usually have an engine cooling system which includes the engine that cooperates with a radiator and a pump for circulating cooling fluid to and from the engine. A fan is used to force air through the radiator to cool fluid heated by the engine and passing through the radiator during operation of the vehicle.

Generally, there are two classes of cooling fan systems employed conventionally to force air through a radiator: (1) engine driven type cooling fans which derive the required power from the crankshaft of the engine, and (2) motor driven cooling fans utilizing an electric motor as a driving source. In the engine driven type cooling systems, a fluid-friction or viscous-drive fan arrangement is provided to utilize the rotation of the engine to power the fan. A disadvantage of this design is a degree of slippage between the input and output parts of the viscous coupling. In addition, there is generally no regulation of the speed of the fan. Fan speed depends on the temperature of the air stream surrounding the bimetallic elements of the viscous coupling. Since fan speed is unregulated, when the vehicle is at idle, the number of revolutions of the engine is low and thus the number of revolutions of the cooling fan is also low. Thus, the engine may tend to over heat due to the lack of capacity of the cooling fan to supply required air to the radiator.

In the case of electric motor driven fans, the fan operates generally at a constant speed independent of the driving conditions of the vehicle. Thus, if the number of revolutions of the cooling fan is preset to suit the cooling requirements for conditions during idling, the cooling capacity tends to be inefficient when the vehicle is operating at high speeds. On the other hand, if the number of revolutions of the electric motor driven cooling fan is preset based on cooling needed when the vehicle is running a high-speed, a large capacity motor must be used which may be too cumbersome for use in many vehicles.

In an attempt to solve these problems, hybrid mechanical and electrical drive engine cooling fan systems have been proposed using an electric motor to drive the cooling fan during idling conditions and using the engine output shaft to drive the cooling fan during high speed vehicle operating conditions. A one way clutch is provided to control whether the electric motor or the engine output shaft drives the fan.

Although the hybrid systems work well for their intended purpose, these systems generally require complicated mechanical connections between the electric motor and the separate clutch which makes the system bulky and thus consumes valuable engine compartment space.

Accordingly, a need exists to provide a simple and compact vehicle cooling system which is efficient and provides effective cooling when the engine is operating at both high speed and at idle conditions.

SUMMARY OF THE INVENTION

An object of the present invention is to provide a simple and compact hybrid or dual drive cooling system wherein an electric motor drives a cooling fan during engine idle conditions and, during high-speed operation of the vehicle, the fan is mechanically driven by the engine in proportion to the engine speed to provide cooling power far in excess of that provided by the electric motor.

In accordance with the principles of the present invention, this objective is obtained by providing a vehicle engine cooling system including a coupling assembly constructed and arranged to be connected to and rotated by a vehicle engine output shaft. An electric motor is provided and includes a motor shaft having first and second ends. An impeller is coupled to the first end of the motor shaft.

A clutch structure is integral with the electric motor. The clutch structure includes an input member carried by the second end of the motor shaft for rotation therewith. An end of the coupling structure is operatively associated with the input member so as to cause rotation of the input member upon rotation of the coupling assembly. An electromagnet structure is disposed about the input member.

The clutch structure also includes output structure having a mounting member fixed to the motor shaft. A movable element, including magnetically permeable material, is mounted with respect to the mounting member for rotational movement therewith and for generally axial movement between a non-engaging position and an engaging position. A spring biases the movable element towards the non-engaging position.

A switching structure is operatively associated with the electric motor and with the electro-magnet structure and is movable between a first position providing electric current to the electric motor and a second position providing electric current to the electro-magnet structure.

The clutch structure is constructed and arranged such that (1) when the switching structure is in the second position energizing the electro-magnet structure, the movable element is attracted magnetically to the electro-magnet structure and moves against the bias of the spring from the non-engaging position thereof to the engaging position thereby contacting the input member so as to rotate with the input member, whereby the engine output shaft drives the motor shaft and thus the impeller, and (2) when the switching structure is moved to the first position, the electromagnet structure is deenergized and the spring returns the movable element to the non-engaging position and out of contact with the input member with the electric motor driving the motor shaft and thus the impeller.

BRIEF DESCRIPTION OF THE DRAWINGS

FIG. 1 is a side view of a hybrid engine cooling system, shown partially in section, provided in accordance with the principles of the present invention;

FIG. 2 is a sectional view of clutch structure of the hybrid engine cooling system of FIG. 1, shown in a disengaged condition; and FIG. 3 is a sectional view of clutch structure of the hybrid engine cooling system of FIG. 1, shown in an engaged condition.

DETAILED DESCRIPTION OF THE INVENTION

Referring to the drawings, a hybrid engine cooling system provided in accordance with the principles of the present invention is shown, generally indicated at 10, in FIG. 1. The system 10 includes a conventional dc electric motor 12 having a motor shaft 14 including a first end 16 and a second end 18. A cooling fan member or impeller 20 is affixed to the second end 16 of the motor shaft 14.

In accordance with the invention, the electric motor 12 is modified to included a clutch structure, generally indicated at 22, mounted integrally therewith. The clutch structure 22 includes a housing 24 secured to an end cap 13 of the electric motor 12. An input member 26 of generally disk shape is carried by the second end 18 of the motor shaft 14 for rotation therewith. The input member 26 is preferably of powdered metal material. A torque transmitting disc 27 is fixed to an end of the input member 26 and defines an engaging face 29 (FIG. 2) of the clutch structure 22, the function of which will become apparent below. The torque transmitting disc 27 may be considered to be part of the input member 26 and is made preferably of metal material of the type used for conventional brake pads.

Bearing structure, generally indicated at 28, rotatably supports the input member 26 on the second end 18 of the motor shaft 14. The bearing structure 28 includes ball bearings 30 journalled in a bearing housing 32 and a bearing retainer 34. The bearing retainer 34 retains the bearing housing 32 with respect to the input member 26 and prevents axial movement of the motor shaft 14. The bearing structure 28 also includes a stabilizing member 36 between the motor shaft 14 and the input member 26. The stabilizing member, preferably made of plastic material, is constructed and arranged to ensure that engaging face 29 of the input member 26 is disposed generally parallel to engaging face 40 of output structure, generally indicated at 42 (FIG. 2), the function of which will become apparent below.

A flexible shaft defining a coupling assembly 44 is coupled to the input member 26 and to the bearing retainer 34 at one end 46 thereof by fasteners. The flexible shaft 44 is of conventional configuration, such as, for example, of the type disclosed in U.S. Pat. No. 4,040,272, the content of which is hereby incorporated into the present specification by reference. In the conventional manner, the other end (not shown) of the flexible shaft 44 is coupled to an output shaft of the engine (not shown) such that rotation of the engine output shaft causes rotation of the flexible shaft 44 and thus, rotation of the input member 26.

Although, in the illustrated embodiment, the coupling assembly 44 is in the form of a flexible shaft, it can be appreciated that any type of coupling assembly may be employed to transfer rotary motion from the engine output shaft to the input member 26. For example, depending on the relative location of the parts, the coupling assembly 44 may be a non-flexible shaft operatively associated with the engine output shaft via a pulley arrangement.

An electro-magnet structure 48 is disposed about the input member 26 and fixed with respect to the housing 24. The electro-magnet structure 48 includes a solenoid coil 50 which is electrically coupled to a voltage source 56 when a switching structure 54 engages contact 52. Thus, in the known manner, when the solenoid coil 50 is energized, a magnetic field is generated.

As best shown in FIG. 2, the clutch structure 22 includes output structure, generally indicated at 42. The output structure 42 includes a mounting member 60 fixed to the motor shaft 14. A moveable element, generally indicated at 62, is mounted on the mounting member 60 for rotary movement therewith and for generally axial movement between a non-engaging position (FIG. 2) and an engaging position (FIG. 3) as will be explained below. In the illustrated embodiment, the movable element 62 is in the form of a plastic disc 63 having an inner insert 64 and an outer insert 66. The inserts 64 and 66 are made of a magnetically permeable material, such as carbon steel. The plastic portion of the moveable element 62 and the inserts 64 and 66 may be joined in a conventional molding operation. The inner insert 64 defines the engaging face 40 of the output structure 42 which contacts the engaging face 29 of the input member 26 when the moveable element 62 is in the engaging position thereof. The outer insert 66 is attracted by the magnetic field generated by the solenoid coil 48 when energized which causes the moveable element 62 to move towards the engaging position thereof. Engaging face 29 and engaging face 40 do not contact each other when the moveable element 62 is in the non-engaging position thereof. It can be appreciated that the moveable element 62 may be of made entirely of a magnetically permeable material if desired.

A retainer 70 is coupled to the mounting member 60 and functions to secure the moveable element 62 to the mounting member 60 for rotational movement therewith. The retainer also has a stop surface 72 which is constructed and arranged to engage surface 74 of the output structure 42 to limit movement of the moveable element 62 towards the non-engaging position thereof. In the broadest aspect of the invention, the retainer 70 may be considered to be a part of the mounting member 60.

As best shown in FIG. 2, a spring 76 is provided to bias the moveable element 62 towards the non-engaging position thereof. In the illustrated embodiment, the spring is a flat spring. However, other types of springs can be used such as coil springs, etc.

With reference to FIGS. 1–3, the operation of the hybrid engine cooling system 10 will be appreciated. When a vehicle employing the system 10 is operating at generally high engine speed, i.e. 3000 rpm, under normal driving conditions, the switching structure 54 is controlled to engage contact 52 to power the solenoid coil 50 generating a magnetic field which causes the movable element 62 to move against the bias of spring 76 to the engaging position with, engaging face 40 of the output structure 42 contacting the engaging face 29 of the input member 26 (FIG. 3). Thus, with the clutch structure 22 in an engaged condition, rotary motion of the engine output shaft causes rotary motion of the motor shaft 14 via the flexible cable 44 to operate the impeller 20.

Since the motor shaft 14 is rotating and the brushes of the electric motor 12 are contacting the commutator of the electric motor 12, the brushes may wear even when the engine output shaft drives the impeller 20. In order to reduce wear of the brushes of the electric motor 12 during this operation, when the clutch structure 22 is moved to the engaged condition, it is preferable to have the brushes lift-off from the commutator in a known manner.

When the vehicle is at idle or operating in heavy traffic, the engine may be operating at approximately 700 rpm. This speed is too low to operate the cooling fan 20 via the engine output shaft to provide sufficient cooling of the engine. Thus, in accordance with the principles of the present invention, during this condition, the switching structure 54 is controlled to engage one of the electric motor contacts 78 and 80 to power the electric motor 12. Thus, when the switching structure 54 is moved to engage either contact 78 or 80 to power the electric motor 12, the solenoid coil 50 is deenergized thus terminating the magnetic field. This causes the spring 76 to bias the moveable element 62 to the non-engaging position thereof. With the clutch structure in this non-engaged position, (FIG. 2) the electric motor 12 drives the motor shaft 14 which in turn operates the impeller 20.

In the illustrated embodiment, the electric motor 12 has two contacts 78 and 80 such that the electric motor may operate at either low or high speed. It can be appreciated that a one speed or a three or more speed motor may be employed in the system 10.

As noted above, the switch structure 52 is controlled to power either the electromagnet structure 48 or the electric motor 12. The switching structure 54 is controlled by the vehicle's on-board computer having a controller. When the vehicle is under normal operating conditions, the engine temperature is relatively constant. However, during an idling condition, the engine temperature increases. Engine temperature is monitored by a temperature sensor and an electrical signal is sent to the controller which in turn sends an electrical signal to the switching structure 54 to control the switching structure 54 to operate either the electric motor 12 or the electromagnet structure 48. Alternatively, pressure sensors and/or rpm sensors may be employed to send electrical signals to the controller to control the switching structure 54.

It is within the contemplation of the invention to employ a one-way clutch as the clutch structure which is made integral with the electric motor. The one-way clutch may transfer rotation from the engine shaft to the electric motor shaft during relative rotation in only one direction.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A vehicle engine cooling system comprising:
    a coupling assembly constructed and arranged to be connected to and rotated by a vehicle engine output shaft;
    an electric motor having a motor shaft including first and second ends;
    an impeller coupled to said first end of said motor shaft;
    a clutch structure integral with said electric motor and comprising:
        an input member carried by said second end of said motor shaft for rotation therewith, an end of said coupling structure being operatively associated with said input member so as to cause rotation of said input member upon rotation of said coupling assembly;
        an electro-magnet structure disposed about said input member;
        output structure having a mounting member fixed to said motor shaft;
        a movable element, including magnetically permeable material, mounted with respect to said mounting member for rotational movement therewith and for movement between a non-engaging position and an engaging position; and
        a spring biasing said movable element towards said non-engaging position, and
    switching structure operatively associated with said electric motor and with said electromagnet structure and movable between a first position providing electric current to said electric motor and a second position providing electric current to said electromagnet structure,
    said clutch structure being constructed and arranged such that (1) when said switching structure is in said second position energizing said electro-magnet structure, said movable element is attracted magnetically to said electro-magnet structure and moves against the bias of said spring from said non-engaging position thereof to said engaging position thereby contacting said input member so as to rotate with said input member, whereby the engine output shaft drives said motor shaft and thus said impeller, and (2) when said switching structure is moved to said first position, said electromagnet structure is deenergized and said spring returns said movable element to said non-engaging position and out of contact with said input member with said electric motor driving said motor shaft and thus said impeller.

2. The system according to claim 1, wherein said coupling assembly is a flexible shaft.

3. The system according to claim 2, wherein said clutch structure includes bearing structure rotatably supporting said input member on said second end of said shaft.

4. The system according to claim 3, wherein said bearing structure includes ball bearings journalled in a bearing housing and a retainer, said retainer retaining said bearing housing and preventing axial movement of said motor shaft.

5. The system according to claim 3, wherein said bearing structure includes a stabilizing member between said motor shaft and said input member, said stabilizing member being constructed and arranged to ensure that an engaging face of said input member is generally parallel to an engaging face of said output structure, said engaging faces being in contacting relation when said movable element is in said engaging position thereof.

6. The system according to claim 5, wherein said output structure is substantially composed of plastic and has a magnetically permeable insert defining said engaging face thereof.

7. The system according to claim 1, wherein said electric motor is constructed to operate at two different speeds.

8. The system according to claim 1, further comprising a retainer constructed and arranged to limit movement of said moveable element as said movable element moves towards its non-engaging position.

9. A drive system for a vehicle engine cooling fan, said system comprising:
    a coupling assembly constructed and arranged to be connected to and rotated by a vehicle engine output shaft;
    an electric motor having a motor shaft including first and second ends, said first end being constructed and arranged to be coupled to a cooling fan; and
    a clutch structure integral with said electric motor and comprising:
        an input member carried by said second end of said motor shaft for rotation therewith, an end of said coupling assembly being operatively associated with said input member so as to cause rotation of said input member upon rotation of said coupling assembly;
        an electro-magnet structure disposed about said input member;
        output structure having a mounting member fixed to said motor shaft;
        a movable element, including magnetically permeable material, mounted with respect to said mounting member for rotational movement therewith and for movement from a non-engaging position into an engaging position; and
        a spring biasing said movable element towards said non-engaging position, said clutch structure being constructed and arranged such that (1) when said electro-magnet structure is energized, said movable element is magnetically attracted to said electro-magnet structure and moves against the bias of said spring from said non-engaging position to said engaging position thereby contacting said input member so as to rotate with said input member, whereby the engine output shaft drives said motor shaft via said coupling assembly, and (2) when said electric-magnet structure is deenergized, said spring returns said movable element to said non-engaging position and out of contact with said input member permitting said electric motor to drive said motor shaft.

10. The system according to claim 9, further comprising switching structure operatively associated with said electric motor and with said clutch structure and movable between a first position providing electric current to said electric motor and a second position providing electric current to said electro-magnet structure of said clutch structure.

11. The system according to claim 9, wherein said clutch structure includes bearing structure rotatably supporting said input member on said second end of said shaft.

12. The system according to claim 11, wherein said bearing structure includes ball bearings journalled in a bearing housing and a retainer, said retainer retaining said bearing housing and preventing axial movement of said motor shaft.

13. The system according to claim 11, wherein said bearing structure includes a stabilizing member between said motor shaft and said input member, said stabilizing member being constructed and arranged to ensure that an engaging face of said input member is generally parallel to an engaging face of said output structure, said engaging faces being in contacting relation when said movable element is in said engaging position thereof.

14. The system according to claim 13, wherein said output structure is substantially composed of plastic and has a magnetically permeable insert defining the engaging face thereof.

15. The system according to claim 9, wherein said electric motor is constructed to operate at two different speeds.

16. The system according to claim 9, further comprising a retainer constructed and arranged to limit movement of said moveable element as said moveable element moves towards its non-engaging position.

17. A drive system for a vehicle engine cooling fan comprising:

an electric motor having a motor shaft, an impeller on said motor shaft;

an electro-magnetic clutch structure on said motor shaft, a coupling assembly constructed and arranged to be connected to and rotated by a vehicle engine output shaft, said coupling assembly being operatively associated with said clutch structure so as to cause rotation of said clutch structure upon rotation of said coupling assembly; and switching structure operatively associated with said electric motor and with said electro-magnetic clutch structure and selectively movable between a first position providing electric current to said electric motor to operate the electric motor, and a second position providing electric current to the electro-magnetic clutch structure so as to operate the clutch structure while terminating power to said electric motor.

18. The system according to claim 17, wherein said clutch structure comprises:

an input member carried by said second end of said motor shaft for rotation therewith, an end of said coupling assembly being operatively associated with said input member so as to cause rotation of said input member upon rotation of said coupling assembly;

an electro-magnet structure disposed about said input member;

output structure having a mounting member fixed to said motor shaft;

a movable element, including magnetically permeable material, mounted with respect to said mounting member for rotational movement therewith and for movement between a non-engaging position and an engaging position; and a spring biasing said movable element towards said non-engaging position, said clutch structure being constructed and arranged such that (1) when said switching structure is in said second position energizing said electro-magnet structure, said movable element is attracted magnetically to said electro-magnet structure and moves against the bias of said spring from said non-engaging position thereof to said engaging position thereby contacting said input member so as to rotate with said input member, whereby the engine output shaft drives said motor shaft and thus said impeller, and (2) when said switching structure is moved to said first position, said electro-magnet structure is deenergized and said spring returns said movable element to said non-engaging position and out of contact with said input member with said electric motor driving said motor shaft and thus said impeller.

19. A drive system according to claim 17, wherein said motor shaft has first and second ends, said impeller is on said first end of said motor shaft and said electro-magnetic clutch structure is on said second end.

* * * * *